United States Patent
Davis et al.

(10) Patent No.: US 10,196,912 B2
(45) Date of Patent: *Feb. 5, 2019

(54) BIFURCATED SLIDING SEAL

(71) Applicant: UNITED TECHNOLOGIES CORPORATION, Farmington, CT (US)

(72) Inventors: Timothy M Davis, Kennebunk, ME (US); Paul M Lutjen, Kennebunkport, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 455 days.

This patent is subject to a terminal disclaimer.

(21) Appl. No.: 14/830,768

(22) Filed: Aug. 20, 2015

(65) Prior Publication Data

US 2016/0115810 A1    Apr. 28, 2016

Related U.S. Application Data

(60) Provisional application No. 62/068,496, filed on Oct. 24, 2014.

(51) Int. Cl.
| | |
|---|---|
| *F16J 15/34* | (2006.01) |
| *F01D 11/00* | (2006.01) |
| *F16J 15/08* | (2006.01) |
| *F16J 15/06* | (2006.01) |

(52) U.S. Cl.
CPC .......... *F01D 11/005* (2013.01); *F16J 15/061* (2013.01); *F16J 15/0806* (2013.01); *F16J 15/0887* (2013.01); *F16J 15/3452* (2013.01); *F05D 2220/32* (2013.01); *F05D 2240/55* (2013.01)

(58) Field of Classification Search
CPC ............................................. F16J 15/02–15/15
See application file for complete search history.

(56) References Cited

U.S. PATENT DOCUMENTS

| | | | | |
|---|---|---|---|---|
| 1,956,366 A | * | 4/1934 | Vedovell | F16J 15/54 |
| | | | | 277/363 |
| 2,514,495 A | | 7/1950 | Johnson | |
| 4,522,410 A | | 6/1985 | Holzer | |

(Continued)

FOREIGN PATENT DOCUMENTS

| | | |
|---|---|---|
| EP | 2108786 A2 | 10/2009 |
| FR | 2743612 A1 | 7/1997 |

(Continued)

OTHER PUBLICATIONS

European Search Report for Application No. 15190481.0-1751; dated Feb. 25, 2016; 6 pgs.

(Continued)

*Primary Examiner* — Vishal A Patel
(74) *Attorney, Agent, or Firm* — Cantor Colburn LLP

(57) ABSTRACT

The present disclosure relates generally to a sliding seal between two components. The sliding seal includes a first seal section and an uncoupled second seal section which allows the first and second seal sections to move relative to one another during relative movement between the two components. A wave spring and/or a rope seal is disposed between the first and second seal sections biases the first and second seal sections away from one another.

16 Claims, 8 Drawing Sheets

(56) References Cited

U.S. PATENT DOCUMENTS

| | | | |
|---|---|---|---|
| 4,783,085 A | 11/1988 | Wicks et al. | |
| 5,009,519 A | 4/1991 | Tatum | |
| 5,014,917 A | 5/1991 | Sirocky et al. | |
| 5,078,412 A * | 1/1992 | Baumgarth | F02K 1/805 239/127.1 |
| 5,158,305 A | 10/1992 | Halling | |
| 5,251,914 A * | 10/1993 | Tatum | E21B 10/25 175/371 |
| 7,121,790 B2 | 10/2006 | Fokine et al. | |
| 7,219,898 B2 | 5/2007 | Mormile et al. | |
| 7,347,425 B2 | 3/2008 | James | |
| 8,651,497 B2 * | 2/2014 | Tholen | F01D 11/005 277/644 |
| 8,661,828 B2 | 3/2014 | Pieussergues et al. | |
| 9,051,968 B2 | 6/2015 | Sundholm et al. | |
| 9,052,016 B2 | 6/2015 | Twelves, Jr. | |
| 2004/0017045 A1 * | 1/2004 | Cross | F02K 1/004 277/377 |
| 2009/0243228 A1 | 10/2009 | Heinemann et al. | |
| 2011/0150635 A1 | 6/2011 | Motzkus et al. | |
| 2012/0195743 A1 | 8/2012 | Walunj et al. | |
| 2013/0113168 A1 | 5/2013 | Lutjen et al. | |
| 2013/0170775 A1 | 7/2013 | Cymbal et al. | |
| 2013/0234407 A1 | 9/2013 | Parrish et al. | |
| 2016/0115809 A1 | 4/2016 | Davis et al. | |

FOREIGN PATENT DOCUMENTS

| | | |
|---|---|---|
| FR | 2937098 A1 | 4/2010 |
| GB | 2385643 A | 8/2003 |
| WO | 2015061108 A1 | 4/2015 |

OTHER PUBLICATIONS

English Abstract for FR2743612A1—Jul. 18, 1997; 1 pg.
English Abstract for FR2937098A1—Apr. 16, 2010; 2 pgs.
European Search Report for Application No. 15190414.1-1610; dated Apr. 28, 2016; 7 pgs.

* cited by examiner

FORWARD ⟷ AFT

BIFURCATED SLIDING SEAL

CROSS REFERENCE TO RELATED APPLICATION

This application claims the benefit of and incorporates by reference herein the disclosure of U.S. Ser. No. 62/068,496, filed Oct. 24, 2015.

TECHNICAL FIELD OF THE DISCLOSURE

The present disclosure is generally related to seals and, more specifically, to a sliding seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or cause them to fail prematurely. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but has even less flexibility.

Improvements in seal design are therefore needed in the art.

SUMMARY OF THE DISCLOSURE

In one embodiment, a seal for sealing a space defined by first and second adjacent components disposed about a centerline is disclosed, the seal comprising: a first seal section; and a second seal section; wherein the first and second seal sections are configured to sealingly engage with the first and second components; a wave spring disposed between the first and second seal sections and operative to bias the first seal section and the second seal section away from one another; and wherein the first and second seal sections are configured to move relative to one another.

In a further embodiment of the above, the first seal section includes a first base and a first leg extending from the first base; and the second seal section includes a second base and a second leg extending from the second base.

In a further embodiment of any of the above, the first seal section and the second seal section are substantially L-shaped in cross-section.

In a further embodiment of any of the above, the first base and the second base are oriented substantially axially; and the first leg and the second leg are oriented substantially radially.

In a further embodiment of any of the above, the first base is supported by the second base.

In a further embodiment of any of the above, the seal is formed from a material selected from one of a high-temperature metal alloy, a high-temperature ceramic fiber material, and a high-temperature ceramic fiber composite, or a combination of two or more of a high-temperature metal alloy, a high-temperature ceramic fiber material and a high-temperature ceramic fiber composite.

In a further embodiment of any of the above, a coating is applied to at least a portion of each of the first and second seal sections.

In a further embodiment of any of the above, a sheath is provided covering at least a portion of each of the first and second seal sections.

In a further embodiment of any of the above, the first and second seal sections are substantially annular.

In a further embodiment of any of the above, the first and second seal sections respectively define first and second gaps at respective opposed ends thereof.

In a further embodiment of any of the above, a bridging seal is disposed adjacent the first and second seal sections and at least partially covering the first and second gaps.

the first seal section comprises a first substantially rounded end in contact with the first component along a first single circumferential line of contact; and the second seal section comprises a second substantially rounded end in contact with the second component along a second single circumferential line of contact.

In a further embodiment of any of the above, the first seal section comprises a third substantially rounded end in contact with the second seal section along a third single circumferential line of contact; and the second seal section comprises a fourth substantially rounded end in contact with the second component along a fourth single circumferential line of contact.

In a further embodiment of any of the above, the wave spring biases the first seal section and the second seal section away from one another in an axial direction.

In a further embodiment of any of the above, a plurality of tabs are provided extending from the first seal section and/or the second seal section and wrapping over a radially outer edge of the wave spring.

In a further embodiment of any of the above, a first compliant seal is disposed between the first seal section and the first component; and a second compliant seal is disposed between the second seal section and the first component.

In another embodiment, a system is disclosed, comprising: a first component including a first surface; a second component including a second surface, the second component disposed adjacent the first component and defining a seal cavity therebetween; wherein the first and second components are disposed about an axial centerline; and a seal disposed in the seal cavity, the seal including: a first seal section; and a second seal section; a wave spring disposed between the first and second seal sections and operative to bias the first seal section and the second seal section away from one another; and wherein the first and second seal sections are configured to move relative to one another; wherein pressure within the seal cavity urges the seal to seat against the first surface and the second surface.

In a further embodiment of any of the above, the first seal section includes a first base and a first leg extending from the first base; and the second seal section includes a second base and a second leg extending from the second base.

In a further embodiment of any of the above, the first seal section comprises a first substantially rounded end in contact with the first component along a first single circumferential line of contact; the second seal section comprises a second substantially rounded end in contact with the second component along a second single circumferential line of contact;

the first seal section comprises a third substantially rounded end in contact with the second seal section along a third single circumferential line of contact; and the second seal section comprises a fourth substantially rounded end in contact with the second component along a fourth single circumferential line of contact.

In another embodiment, a seal for sealing a space defined by first and second adjacent components disposed about a centerline is disclosed, the seal comprising: a first seal section including a first base, a first leg and a frustoconical section joining the first base and the first leg; and a second seal section including a second base and a second leg extending from the second base; wherein the first and second seal sections are configured to sealingly engage with the first and second components; a rope seal disposed between the first and second seal sections and operative to bias the first seal section and the second seal section away from one another; and wherein the first and second seal sections are configured to move relative to one another.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
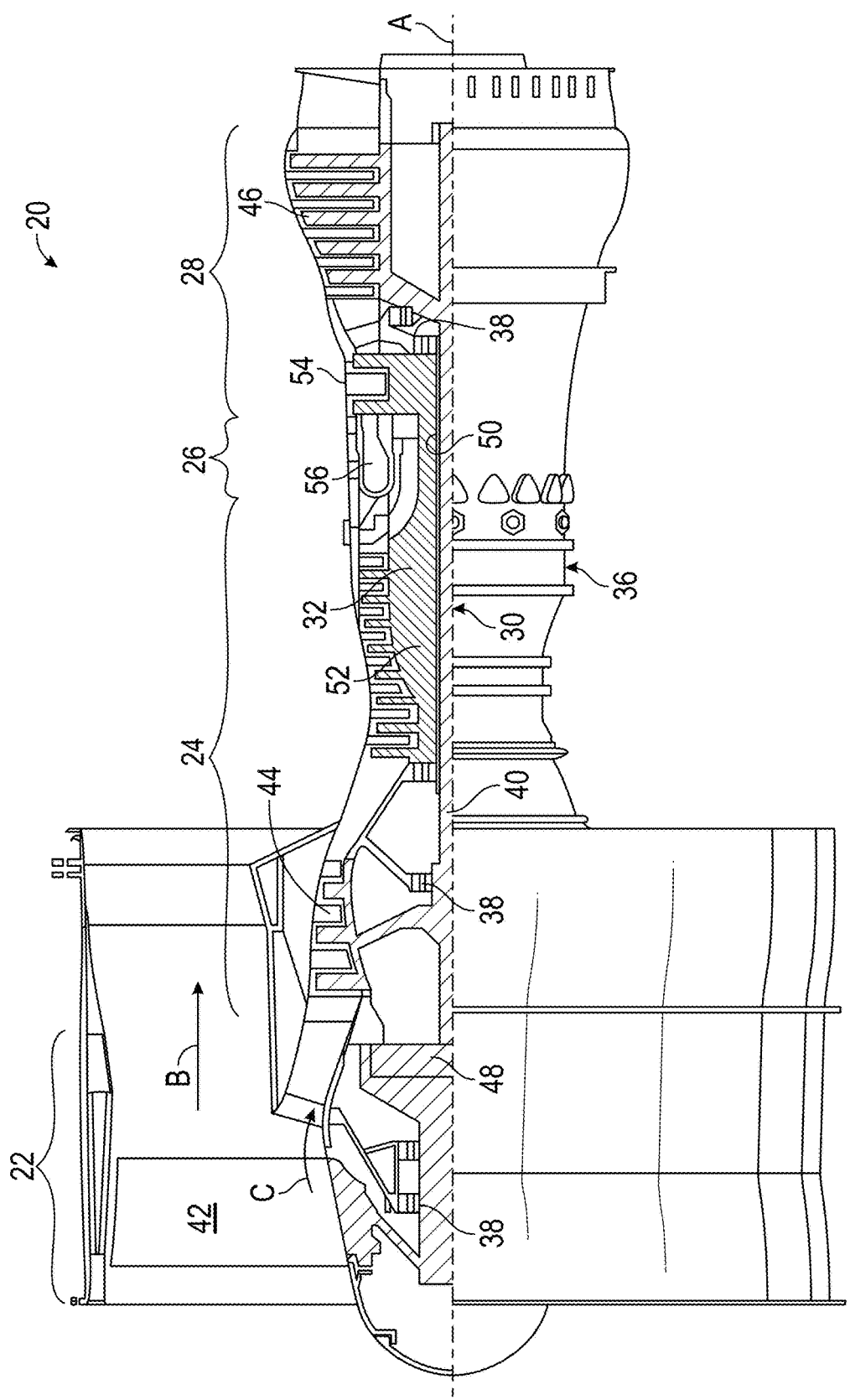
FIG. 1 is a schematic cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° R)]^{0.5}$. The "Low corrected fan tip speed" as disclosed herein according to one non-limiting embodiment is less than about 1150 ft/second (350.5 m/sec).

Figure 2:
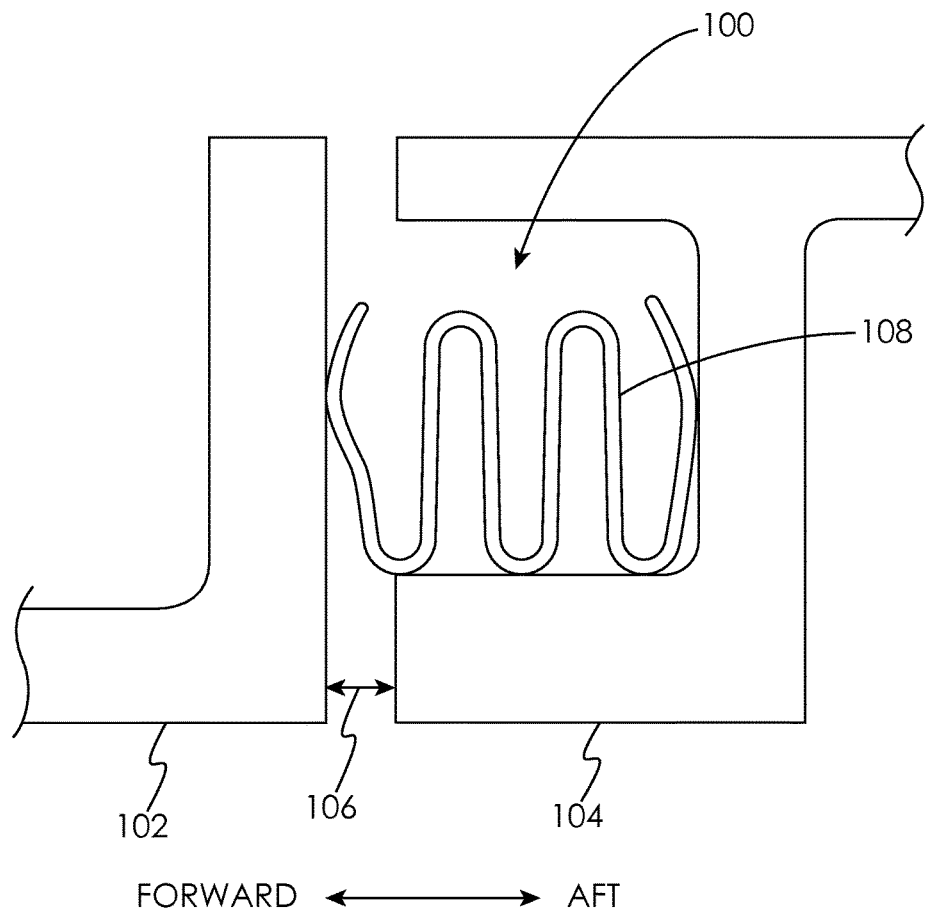
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop turbine components 102 and 104 which may move axially, radially, and circumferentially relative to one another about an axial centerline of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies a w-seal 108 formed from a material appropriate to the anticipated operating conditions (e.g., deflection, temperature change, pressure, etc.) of the w-seal 108, such a nickel-base alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
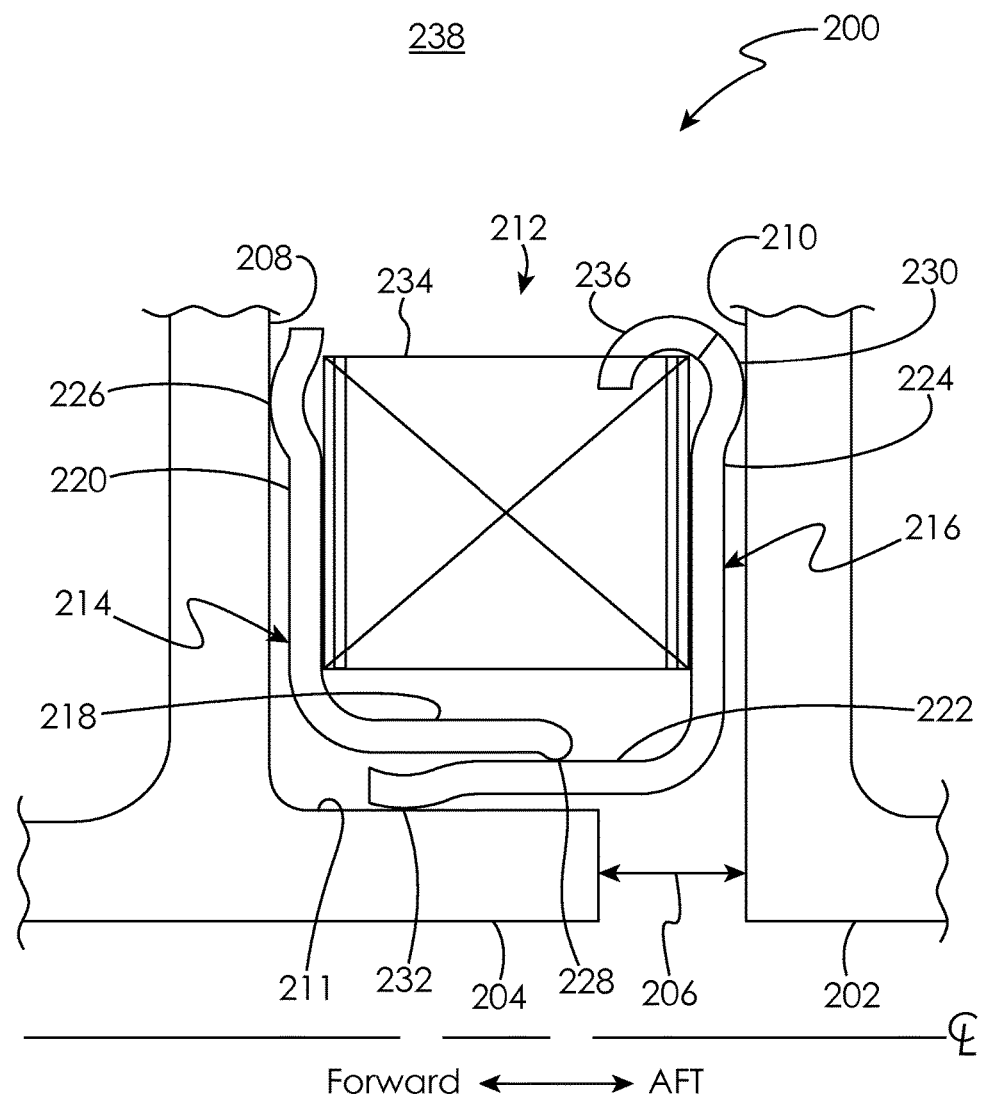
FIG. 3 is a schematic cross-sectional view of a seal and seal cavity in an embodiment.

FIG. 3 schematically illustrates a cross-sectional view of a seal cavity 200 formed by two axially-adjacent segmented or full hoop turbine components 202 and 204 which may move axially, radially, and circumferentially relative to one another about an axial centerline of the turbine engine. A nominal design clearance 206 exists between the components 202 and 204. Component 202 includes a surface 210 facing the seal cavity 200 and component 204 includes surfaces 208 and 211 facing the seal cavity 200. Within the seal cavity 200 lies a seal 212 formed from a material appropriate to the anticipated operating conditions of the seal 212, such as a high-temperature metal alloy, a high temperature ceramic material, a high temperature ceramic composite, or a combination of two or more of these, to name just a few non-limiting examples. The seal 212 is formed from a first seal section 214 and a second seal section 216. The first seal section 214 is generally L-shaped in cross-section and includes a base 218 and a leg 220. The second seal section 216 is also generally L-shaped in cross-section and includes a base 222 and a leg 224. The bases 218, 222 are oriented substantially axially, while the legs 220, 224 are oriented substantially radially. The base 218 is supported by the base 222 in an embodiment, while in another embodiment the base 222 is supported by the base 218. The seal 212 may include a coating and/or a sheath to provide increased wear resistance.

The seal section 214 includes a forward substantially rounded end 226 in contact with the surface 208 such that the seal section 214 contacts the surface 208 along a single circumferential line of contact. As used herein, the phrase "circumferential line of contact" is intended to encompass lines that form a complete circle but which may have a gap formed therein, and includes lines with a nominal radial or axial thickness. The seal section 214 also includes an aft substantially rounded end 228 in contact with the seal section 216 (or the surface 211 in some embodiments) such that the seal section 214 contacts the seal section 216 (or the surface 211 in some embodiments) along a single circumferential line of contact. The seal section 216 includes an aft substantially rounded end 230 in contact with the surface 210 such that the seal section 216 contacts the surface 210 along a single circumferential line of contact. The seal section 216 also includes forward substantially rounded end 232 in contact with the surface 211 (or the seal section 214 in some embodiments) such that the seal section 216 contacts the surface 211 (or the seal section 214 in some embodiments) along a single circumferential line of contact.

Figure 4:
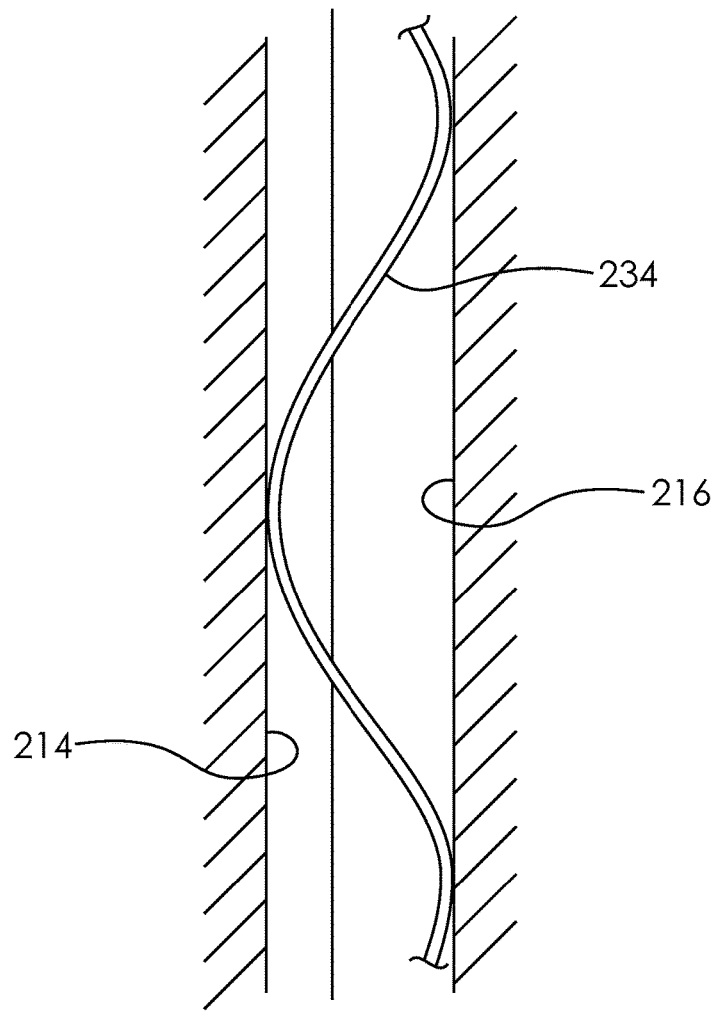
FIG. 4 is a schematic plan view of a wave spring in an embodiment.

A full hoop wave spring 234 is disposed within the cavity defined by the seal section 214 and the seal section 216. A plan view of a portion of the wave spring 234 is illustrated in FIG. 4. In an embodiment, one (see FIG. 3) or both (see FIG. 5) of the seal sections 214, 216 may include a plurality of tabs 236 spaced around their radially outer circumference. The tabs 236 wrap over the radially outer edge of the wave spring 234, thereby securing the wave spring 234 within the cavity defined by the seal section 214 and the seal section 216. When both the seal section 214 and the seal section 216 include tabs 236, the seal 212 comprises a discrete assembly that may be handled and installed as a single piece.

Pressure in a secondary flow cavity 238 is transmitted to the seal cavity 200 through an opening defined by the components 202, 204. This pressure acts upon the surfaces of the seal sections 214, 216, thereby causing the leg 220 to seat against the surface 208 of the component 204, the leg 224 to seat against the surface 210 of the component 202, and the base 218 to seat against the base 222. The load applied by base 218 to base 222 helps base 222 to seat against the surface 211, thereby providing a secondary seal against flow that may leak past the leg 220/surface 208 interface, such as during engine start-up, for example. This prevents most or all of the secondary flow cavity 238 gases from reaching the design clearance 206 area and flow path. As the two components 202 and 204 move relative to each other in the axial and/or radial direction, the seal sections 214, 216 are free to slide relative to one another in the axial and circumferential directions while the pressure forces acting upon the surfaces of the seal sections 214, 216 load the seal 212 so that it remains in contact with both components 202 and 204 as shown. Therefore, sealing is maintained while the components 202 and 204 and the components of the seal 212 move relative to one another. Because the seal sections 214, 216 slide with respect to one another and with respect to the components 202, 204, the seal 212 is not substantially deflected by the relative movement between the components 202 and 204.

Furthermore, the circumferentially-oriented wave spring 234 pushes the seal sections 214 to remain in contact with the forward wall 208, and also pushes the seal section 216 to remain in contact with the aft wall 210 when the cavity 200 is not pressurized. This prevents the seal 212 from being damaged during transportation and installation, and also ensures that the seal 212 is instantly and positively pressurized/pressure-energized at engine start-up. In operation, the pressure loading on both seal sections 214, 216 is significant, because the contact points 226, 230 are well outboard, ensuring good sealing at the contact points 226, 230. Seal section 214 is split at one circumferential location to enable pressure to load the seal section 214 radially inward against the seal section 216. Also, splitting the seal section 216 creates an additional sealing surface at the bottom of the seal cavity 200, as well as allowing the seal 212 to be packaged within a smaller radial design space. Leakage can be reduced significantly at the split location of each seal section 214, 216 by off-setting one split relative to the other, and further reduced by adding a sliding bridge to the cover the gap in the radially outer seal section 214 and/or the outer portion of section 216.

Figure 5:
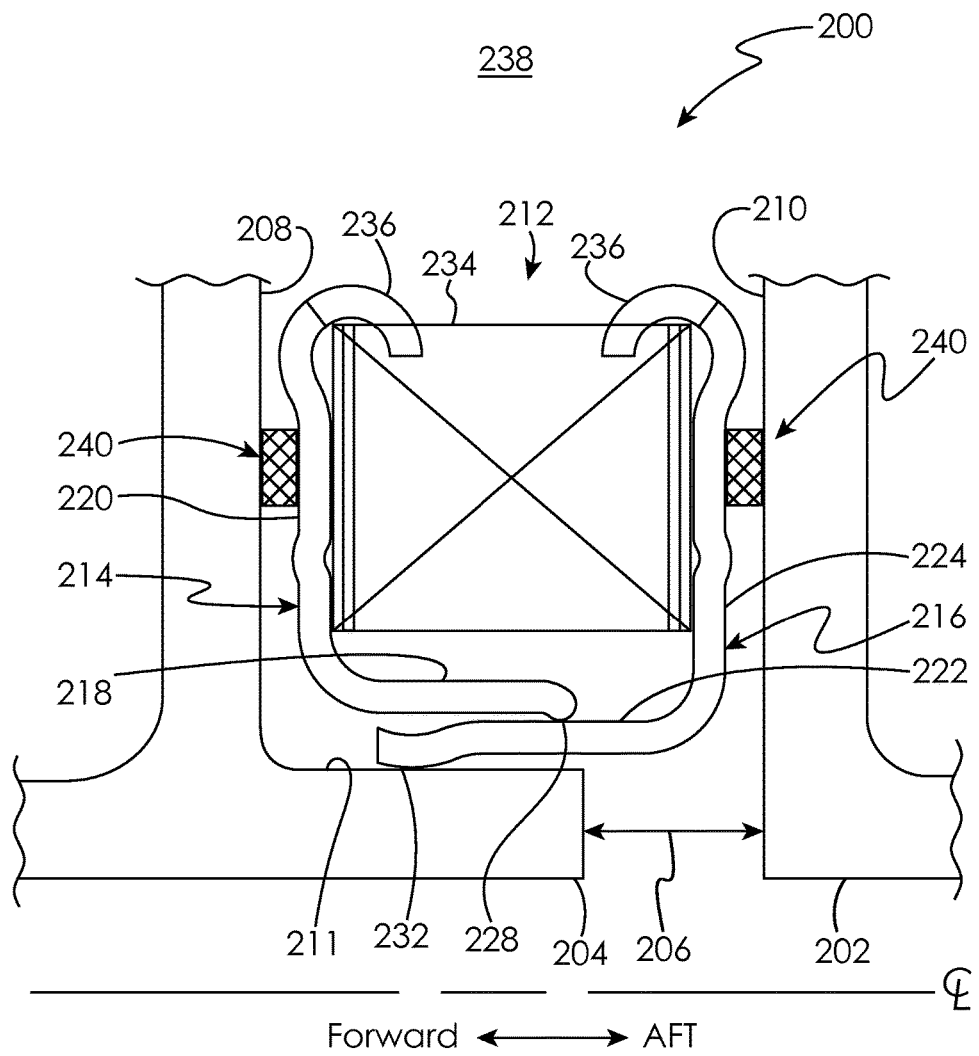
FIG. 5 is a schematic cross-sectional view of a seal and seal cavity in an embodiment.

In the embodiment of FIG. 5, the seal 212 may include a full hoop high-temperature and compliant seal 240, such as a woven or braided ceramic rope seal or flat fabric (for example, NEXTEL ceramic textile available from The 3M Company of Maplewood, Minn. USA, to name just one non-limiting example) to partially seal stair-stepped gaps typical of segmented part interfaces of the components 202, 204 in some embodiments. The compliant seal 240 may be disposed between the leg 220 and the surface 208 of the component 204, as well as between the leg 224 and the surface 210 of the component 202. The compliant seal 240 may be bonded to or mechanically attached to the seal section 214, 216 or to the component 202, 204. The compliant seal 240 adds compliance to the seal 212 in the axial direction. In another embodiment, another compliant seal (not shown) may also be added to the radially inner side of leg 222 to contact surface 211 (or to the radially inner side of leg 218 in embodiments where leg 222 is supported by leg 218).

Figure 6:
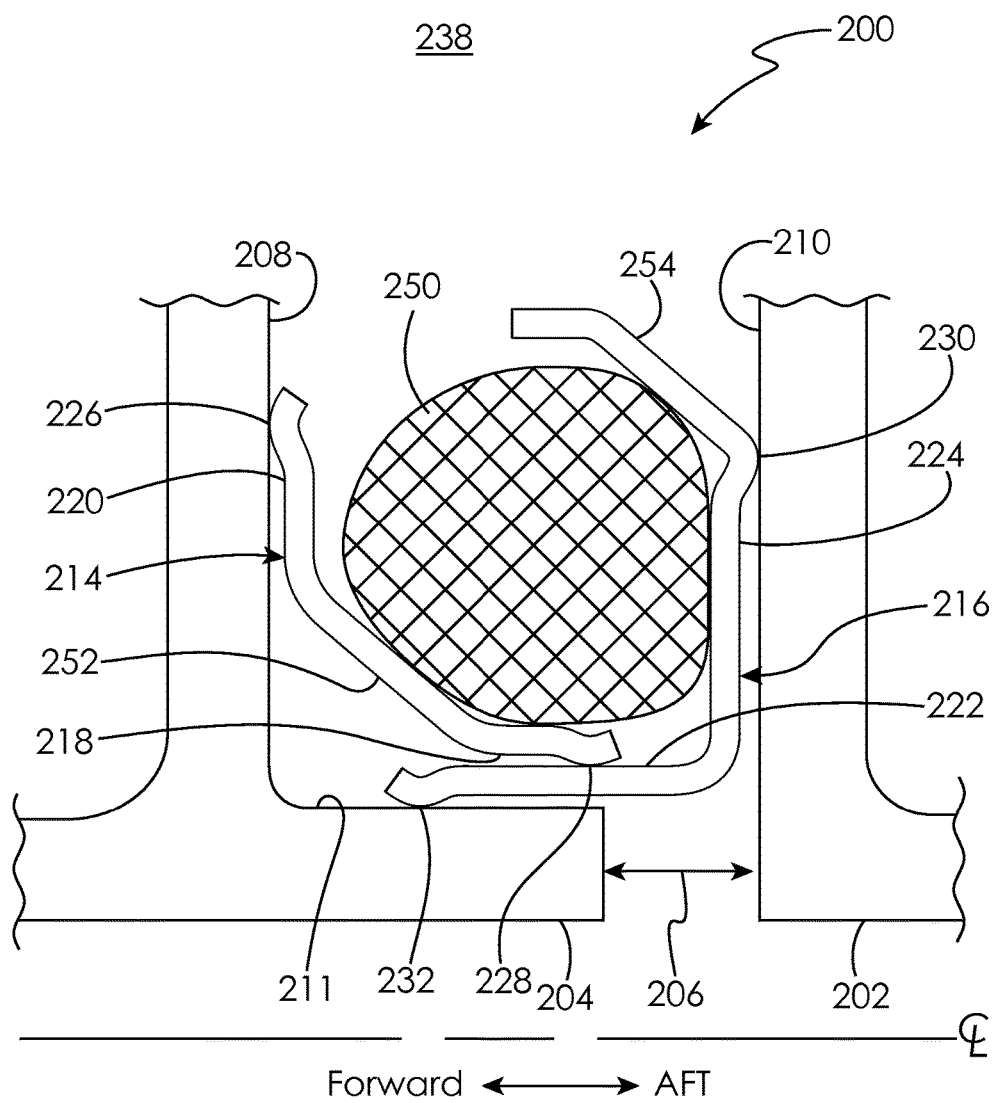
FIG. 6 is a schematic cross-sectional view of a seal and seal cavity in an embodiment.

In the embodiment of FIG. 6, the wave spring may be replaced with a rope seal 250. An angled portion 252, extending both radially and axially, may be provided to couple the base 218 to the leg 220 and to provide a main surface upon which the rope seal 250 my act with respect to the seal section 214. The angled portion 252 provides forward space into which the rope seal 250 may move when compressed, thereby increasing axial resilience. A radially outer extension 254 provides radial space into which the rope seal 250 may move when compressed, thereby increasing radial resilience. The extension 254 additionally traps the rope seal 250 between the seal sections 214, 216 to prevent liberation of the rope seal 250. Although the rope seal 250 may be less resilient than a wave spring in some embodiments, the rope seal 250 provides additional sealing for flow between the seal sections 214, 216 and may also enable use of the seal 212 in higher temperature environments. For seal applications with only moderate axial travel, the rope seal 250 will provide adequate resilience to ensure that the seal sections 214, 216 are in contact with the components 202, 204 during engine start. During engine operation, pressure differential alone provides the force required to ensure that the seal sections 214, 216 are in contact with the components 202, 204.

Figure 7:
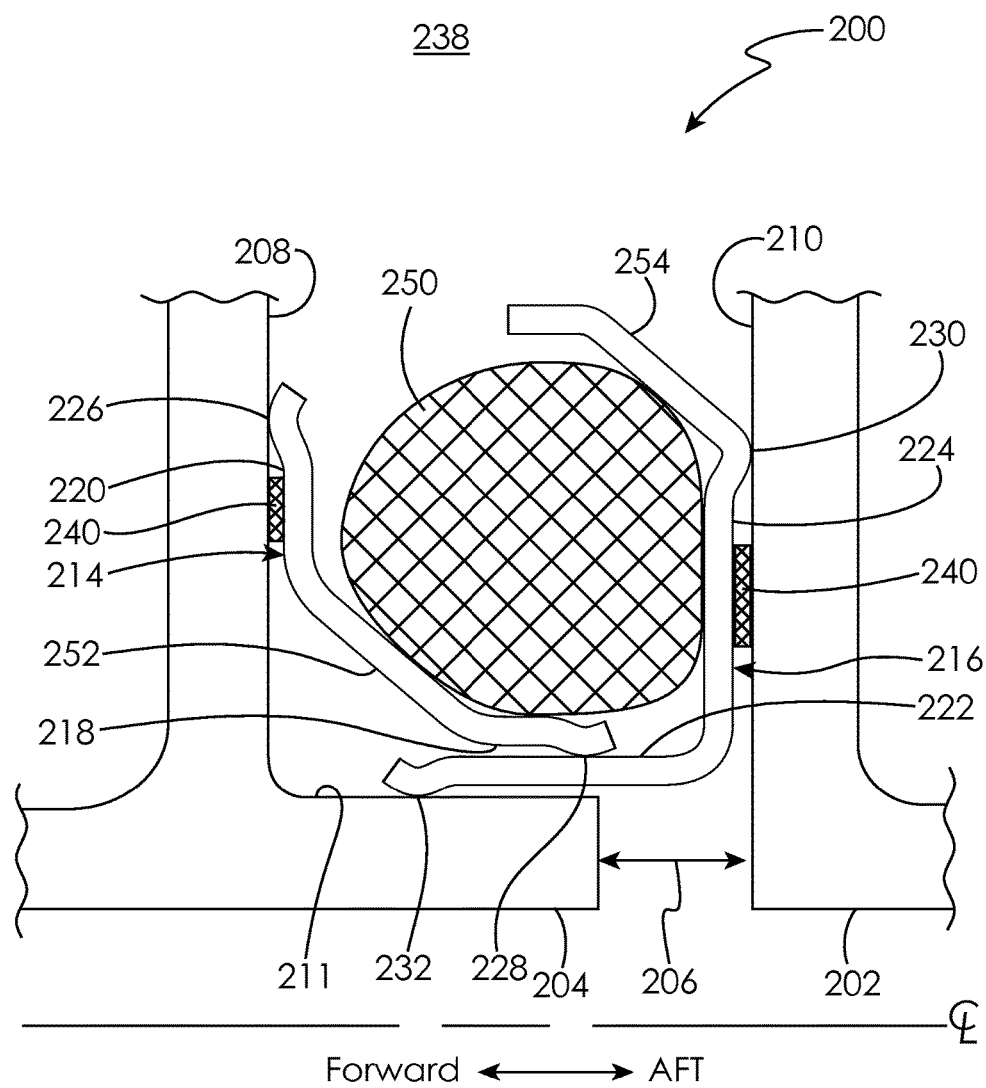
FIG. 7 is a schematic cross-sectional view of a seal and seal cavity in an embodiment.

In the embodiment of FIG. 7, the seal of FIG. 6 may include a full hoop high-temperature and compliant seal 240, such as a woven or braided ceramic rope seal or flat fabric (for example, NEXTEL ceramic textile available from The 3M Company of Maplewood, Minn. USA, to name just one non-limiting example) to partially seal stair-stepped gaps typical of segmented part interfaces of the components 202, 204 in some embodiments. The compliant seal 240 may be disposed between the leg 220 and the surface 208 of the component 204, as well as between the leg 224 and the surface 210 of the component 202. The compliant seal 240 may be bonded to or mechanically attached to the seal section 214, 216 or to the component 202, 204. The compliant seal 240 adds compliance to the seal 212 in the axial direction. In another embodiment, another compliant seal (not shown) may also be added to the radially inner side of leg 222 to contact surface 211.

Figure 8:
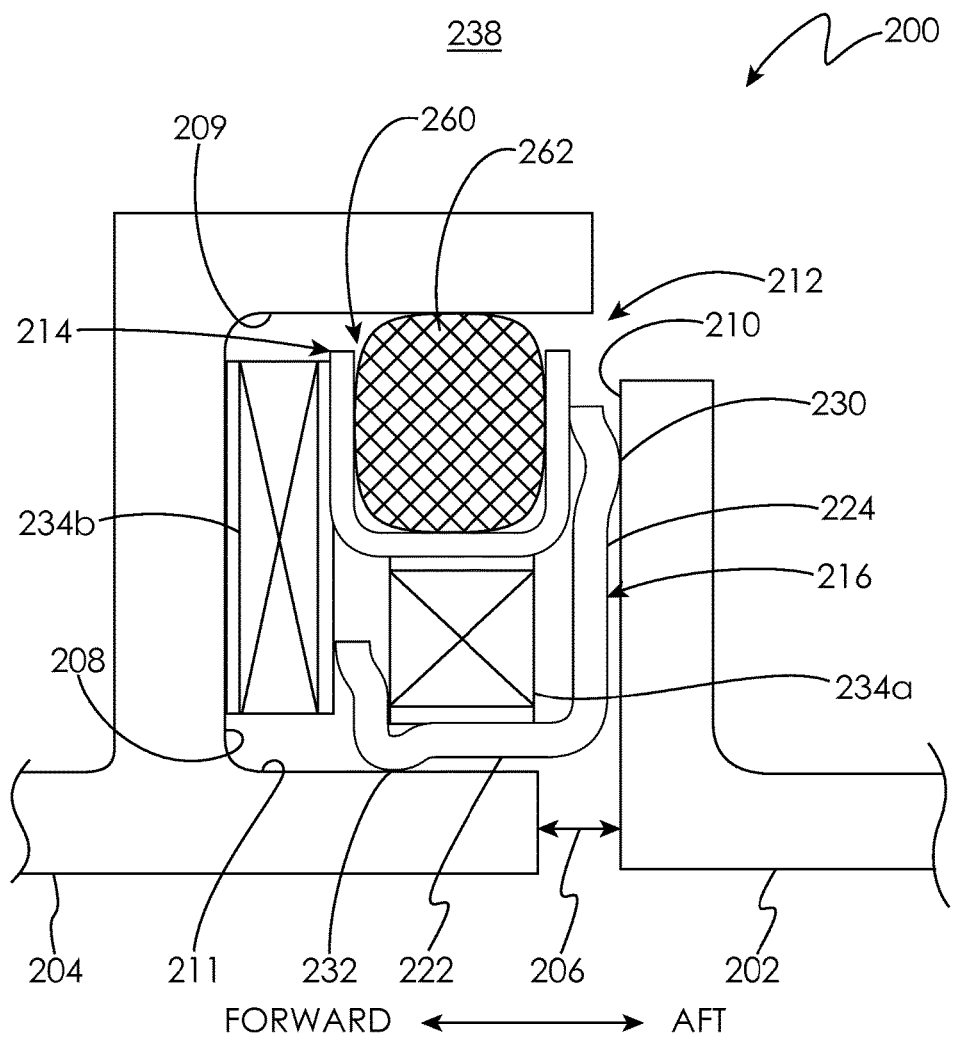
FIG. 8 is a schematic cross-sectional view of a seal and seal cavity in an embodiment.

In the embodiment of FIG. 8, seal section 214 is substantially U-shaped in cross-section and defines a cavity 260 therein. A rope seal 262 is disposed within the cavity 260 and sealingly engages an outer radial surface 209 of the component 204. A first wave spring 234a is disposed between the first seal section 214 and the second seal section 216 and is operative to bias the first seal section 214 away from the second seal section 216 in the radial direction. This causes the rope seal 262 to seal against the surface 209 of the component 204, while the protrusion 232 of the second seal section 216 seals against the surface 211 of the component 204. An optional second wave spring 234b is disposed between the component 204 and both the first seal section 214 and the second seal section 216 The second seal section 216 may include a radial extension 264 of the base 222 that is contacted by the second wave spring 234b. The axial bias applied by the second wave spring 234b against the seal sections 214, 216 biases the protrusion 230 to sealingly engage the surface 210 of the component 202. The substantially U-shaped seal section 214 traps the rope seal 262 between the seal section 214 and the surface 209 of the component 204 to prevent liberation of the rope seal 262. The wave spring 234a provides resilience in the radial direction, while the wave spring 234b provides resilience in the axial direction. The wave springs 234a, 234b ensure that the seal sections 214, 216 are in contact with the components 202, 204 during engine start. During operation of the engine, the differential pressure acting on the seal 212 creates an axial load at the protrusion 230 without requiring axial loading from the second wave spring 234b.

Compared to the seal 108 of FIG. 2, the wave spring 234 exhibits improved resilience since the wave spring 234 can be configured to have a much lower spring rate within the same axial design space. The seal sections 214, 216 are not deflected as the components 202 and 204 move relative to each other during engine assembly and engine operation, which is beneficial because the seal sections 214, 216 can be made from a lower strength and/or thicker sheet material that may be lower cost, have higher temperature capability, be more manufacturable, more wear-resistant, and/or more wear tolerant. Furthermore, the wave spring 234 is shielded from high conductive and radiant heat load by the seal sections 214, 216. Additionally, the seal 212 is less susceptible to distortion or breakage, which can cause leakage of gas past the seal 212 and/or liberation of the seal.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined by first and second adjacent components disposed about a centerline, the seal comprising:
a first seal section, the first seal section having a first base extending axially and a first leg extending radially from the first base; and
a second seal section, wherein the first seal section and/or the second seal section have a plurality of tabs spaced around their radial outer circumference, the second seal section having a second base extending axially and a second leg extending radially from the second base and wherein the plurality of tabs extend from the first leg and/or the second leg and wherein the first base is supported and contacted by the second base;
wherein the first and second seal sections are configured to sealingly engage with the first and second components;
a wave spring disposed in a cavity defined by the first and second seal sections and operative to bias the first seal section and the second seal section away from one another; and
wherein the plurality of tabs wrap over a radial outer edge of the wave spring in order to secure the waver spring in the cavity, wherein a distal end of the plurality of tabs extends radially inward from the radial outer edge of the wave spring and wherein the first and second seal sections are configured to move relative to one another.

2. The seal of claim 1, wherein the first seal section and the second seal section are substantially L-shaped in cross-section.

3. The seal of claim 1, wherein:
the first base and the second base are oriented substantially axially; and
the first leg and the second leg are oriented substantially radially.

4. The seal of claim 1, wherein the seal is formed from a material selected from one of a high-temperature metal alloy, a high-temperature ceramic fiber material, and a high-temperature ceramic fiber composite, or a combination of two or more of a high-temperature metal alloy, a high-temperature ceramic fiber material and a high-temperature ceramic fiber composite.

5. The seal of claim 1, further comprising:
a coating applied to at least a portion of each of the first and second seal sections.

6. The seal of claim 1, further comprising:
a sheath covering at least a portion of each of the first and second seal sections.

7. The seal of claim 1, wherein:
the first and second seal sections are substantially annular.

8. The seal of claim 7, wherein the first and second seal sections respectively define first and second gaps at respective opposed ends thereof.

9. The seal of claim 8, further comprising a bridging seal disposed adjacent the first and second seal sections and at least partially covering the first and second gaps.

10. The seal of claim 1, wherein the wave spring biases the first seal section and the second seal section away from one another in an axial direction.

11. The seal of claim 1, wherein the wave spring is a full hoop wave spring.

12. The seal of claim 1, further comprising:
a first compliant seal disposed between the first seal section and the first component; and
a second compliant seal disposed between the second seal section and the first component.

13. A system, comprising:
a first component including a first surface;
a second component including a second surface, the second component disposed adjacent the first component and defining a seal cavity therebetween;
wherein the first and second components are disposed about an axial centerline; and
a seal disposed in the seal cavity, the seal including:
a first seal section, the first seal section having a first base extending axially and a first leg extending radially from the first base; and
a second seal section, wherein the first seal section and/or the second seal section have a plurality of tabs spaced around their radial outer circumference, the second seal section having a second base extending axially and a second leg extending radially from the second base and wherein the plurality of tabs extend from the first leg and/or the second leg and wherein the first base contacts the second base at a point of contact and the first base is supported by the second base;
a wave spring disposed in a cavity defined the first and second seal sections and operative to bias the first seal section and the second seal section away from one another; and
wherein the plurality of tabs wrap over a radial outer edge of the wave spring in order to secure the waver spring in the cavity, wherein a distal end of the plurality of tabs extends radially inward from the radial outer edge of the wave spring and wherein the first and second seal sections are configured to move relative to one another;
wherein pressure within the seal cavity urges the seal to seat against the first surface and the second surface.

14. The system of claim 13, wherein:
the first seal section comprises a first substantially rounded end in contact with the first component along a first single circumferential line of contact; and
the second seal section comprises a second substantially rounded end in contact with the second component along a second single circumferential line of contact.

15. The system of claim 14, wherein:
the first seal section comprises a third substantially rounded end in contact with the second section at the point of contact along a third single circumferential line of contact, and
the second seal section comprises a fourth substantially rounded end in contact with the second component along a fourth single circumferential line of contact.

16. The system of claim 13, wherein:
the first seal section comprises a first substantially rounded end in contact with the first component along a first single circumferential line of contact;
the second seal section comprises a second substantially rounded end in contact with the second component along a second single circumferential line of contact;
the first seal section comprises a third substantially rounded end in contact with the second seal section along a third single circumferential line of contact; and
the second seal section comprises a fourth substantially rounded end in contact with the first component along a fourth single circumferential line of contact.

* * * * *